No. 635,661. Patented Oct. 24, 1899.
W. J. COLE.
AIR VALVE.
(Application filed June 15, 1898.)
(No Model.)
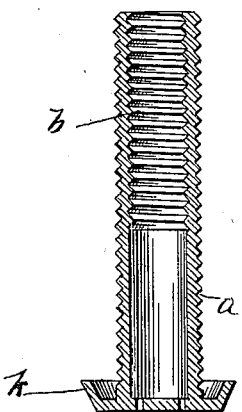
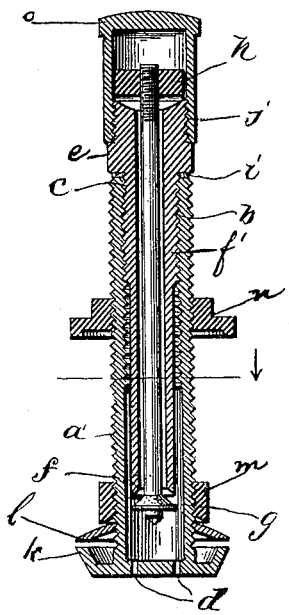
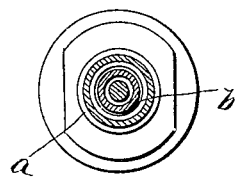
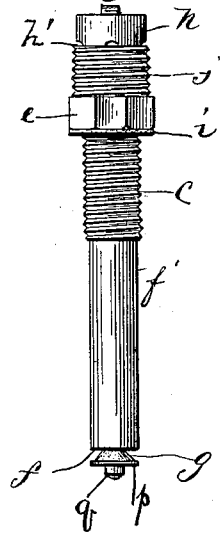
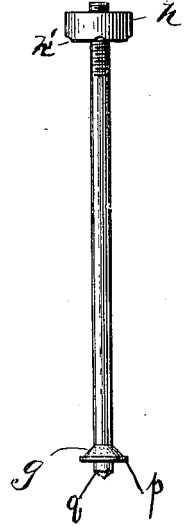
Witnesses:
Frank W Verges
Mrs Sophia Harper
Inventor:
William Jackson Cole

UNITED STATES PATENT OFFICE.

WILLIAM JACKSON COLE, OF EVANSVILLE, INDIANA.

AIR-VALVE.

SPECIFICATION forming part of Letters Patent No. 635,661, dated October 24, 1899.

Application filed June 15, 1898. Serial No. 683,533. (No model.)

*To all whom it may concern:*

Be it known that I, WILLIAM JACKSON COLE, a citizen of the United States, residing at Evansville, in the county of Vanderburg and State of Indiana, have invented certain new and useful Improvements in Air-Valves, of which the following is a specification.

My invention relates to air-valves to be attached to pneumatic tires on bicycles and other vehicles.

The object of my invention is to provide a valve with a stem or casing that may be permanently attached to the inflatable tube and from which casing the valve proper may be conveniently removed and replaced, that may be opened or hermetically closed, that will permit of easy inflation and deflation, and is without internal angles, nipples, crevices, guides, springs, or washers. To these ends I have devised the improved valve hereinafter described and claimed.

Figure 1 represents a view of a section of the casing for securing the valve-stem to the tire. Fig. 2 represents a view of the plug having the valve-seat thereon. Fig. 3 represents a cross-sectional view on line $x\,x$, Fig. 5, of the body of the valve. Fig. 4 represents a view of the conical valve with threaded stem and set-nut thereon. Fig. 5 represents a view of a vertical section of the entire valve.

The tubular shell or casing $a$ (shown in Fig. 1) may be made of one piece, or the stem may be pressed into head-piece $k$. Said casing is provided with threads $a'$ from the external end to near the head $k$ to receive the nuts $m\,n$ and a few threads $b$ on the inside at the outer end to receive the threads $c$ of the valve-seat piece $f'$. (Shown on Fig. 2.) The head $k$ is perforated, having a small hole $d$ on either side of the center for the ingress and exit of air. Said head-piece $k$ is not to be removed from the inflatable tube for any purpose, but is to be made to grasp the edge of the aperture in said tube by means of a washer $l$ and jam-nut $m$ or other means that will prevent leakage. The casing $a$ is to be passed through the rim of the wheel and secured in place by nut $n$ or otherwise, or the said casing may be made without the threads $a'$, head-piece $k$, washer $l$, and nuts $m\,n$ and be so shaped as to admit of attachment to the inflatable tube by means of the rubber connections now in common use.

The valve-seat $f$, as shown in Fig. 2, and the entire inner surface of the valve-seat piece $f'$ are made smooth to avoid dust accumulations, and so is the external surface of the internal end up to threads $c$, which part is intended to slip freely into the opening in the casing (shown in Fig. 1) until the threads $b\,c$ engage, when the insertion is completed by rotary screw motion, which may be finished with great power by applying a wrench to the nut-head $e$ on the piece $f'$. The inner end of said valve-seat piece $f'$ (shown in Fig. 2) has a flared cup or valve-seat $f$ for receiving the conical valve $g$. (Shown in Fig. 4.)

Just external to the threads $c$ and sunken into nut-head $e$ is a small groove $i$ for receiving a rubber or leather washer, against which the external end of the aforesaid stem or casing is forced with power sufficient to prevent leakage. The external end of said seat-piece $f'$ is provided with threads $j$ for receiving the pump connection and dust-cap, and the external opening is flared to more readily admit the air through the grooves $h'$ in set-nut $h$.

By loosening the set-nut $h$ the valve $g$ is permitted to rise from its seat $f$ in the usual way by air-pressure during inflation, and when inflation ceases the internal air-pressure automatically forces the conical valve $g$ against the valve-seat $f$, preventing the loss of air while the pump is being detached and the set-nut $h$ tightened.

The rubber conical valve $g$, as shown in Figs. 2 and 5 of the drawings, is designed to be compressed between two metal surfaces. By turning set-nut $h$ to the right the thin metal head $p$ and the metal valve-seat $f$ are made to approach each other, thus compressing the said conical valve $g$ with any degree of power desired to prevent leakage.

Having thus described my invention, what I desire to claim and secure by Letters Patent is—

1. In a valve for pneumatic tires, an internally-threaded casing without internal shoulder or valve-seat, combined with a valve-seat piece having a longitudinal smooth-bore passage therethrough and containing a valve-seat at the internal end and a flared opening at the external end thereof, a valve-stem holding a combined metal and rubber conical valve on the internal end and threads on the external end with a grooved set-nut on said threads substantially as set forth and shown in the drawings.

2. In a valve for pneumatic tires, a casing and valve-seat piece in combination with a combined metal and rubber conical valve as aforesaid, a valve-stem extending through the longitudinal passage in said valve-seat piece and receiving on its externally-threaded end a grooved set-nut adapted to force and hold the valve against the valve-seat.

WILLIAM JACKSON COLE.

Witnesses:
AZRO DYER,
WM. REISTER.